US012568273B2

(12) United States Patent
Card, II

(10) Patent No.: US 12,568,273 B2
(45) Date of Patent: *Mar. 3, 2026

(54) SYSTEMS AND METHODS FOR ASSESSING VIEWER INTEREST IN CONTENT AND ADVERTISEMENTS

(71) Applicant: DISH Technologies L.L.C., Englewood, CO (US)

(72) Inventor: John Card, II, Denver, CO (US)

(73) Assignee: DISH Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,759

(22) Filed: Sep. 11, 2023

(65) Prior Publication Data

US 2023/0421846 A1    Dec. 28, 2023

Related U.S. Application Data

(63) Continuation of application No. 17/838,959, filed on Jun. 13, 2022, now Pat. No. 11,792,480, which is a
(Continued)

(51) Int. Cl.
*H04H 60/32* (2008.01)
*G06Q 30/0242* (2023.01)
(Continued)

(52) U.S. Cl.
CPC ... *H04N 21/44222* (2013.01); *G06Q 30/0242* (2013.01); *H04H 60/33* (2013.01);
(Continued)

(58) Field of Classification Search
CPC .......... H04N 21/44222; H04N 21/251; H04N 21/252; H04N 21/2668; H04N 21/4532;
(Continued)

(56) References Cited

U.S. PATENT DOCUMENTS 7,178,720 B1 *   2/2007   Strubbe .................. G06Q 10/00
                                                                   235/383
8,150,713 B2     4/2012   Clements et al.
                          (Continued)

FOREIGN PATENT DOCUMENTS

JP          2002-247609 A      8/2002
JP          2012-039498 A      2/2012
KR          10-0923780 B1     10/2009

OTHER PUBLICATIONS

International Preliminary Report on Patentability received for PCT Patent Application No. PCT/US13/052364, mailed on Feb. 5, 2015, 8 pages.
(Continued)

*Primary Examiner* — Sahar Aqil Riaz
(74) *Attorney, Agent, or Firm* — Kipman T. Werking; Frontier IP Law PLLC

(57) ABSTRACT

A method for assessing viewer interest in content and advertisements may include receiving an indication regarding a content playback mode change (e.g., a change from a skip or fast-forward mode to a pause or rewind mode) occurring during playing of a media content segment such as a television program or movie. The method then proceeds to associate the playback mode change with a sub-segment of the television program, such as an advertisement or commercial, and a level of interest of a user in the advertisement or commercial is determined based on the associated content playback mode change. An item, such as an advertisement or promotional offer can be selected to be presented to the user based on the determined level of interest of the user in the advertisement or commercial. Systems for assessing viewer interest in content and advertisements include devices and components configured to perform or enable such methods.

17 Claims, 7 Drawing Sheets

Related U.S. Application Data continuation of application No. 16/020,709, filed on Jun. 27, 2018, now Pat. No. 11,381,873, which is a continuation of application No. 15/262,849, filed on Sep. 12, 2016, now Pat. No. 10,034,051, which is a continuation of application No. 13/560,697, filed on Jul. 27, 2012, now Pat. No. 9,445,163.

(51) Int. Cl.

| | |
|---|---|
| *H04H 60/33* | (2008.01) |
| *H04N 21/25* | (2011.01) |
| *H04N 21/2668* | (2011.01) |
| *H04N 21/442* | (2011.01) |
| *H04N 21/45* | (2011.01) |
| *H04N 21/466* | (2011.01) |
| *H04N 21/472* | (2011.01) |
| *H04N 21/658* | (2011.01) |
| *H04N 21/81* | (2011.01) |
| *H04N 21/845* | (2011.01) |

(52) U.S. Cl.
CPC ......... *H04N 21/251* (2013.01); *H04N 21/252* (2013.01); *H04N 21/2668* (2013.01); *H04N 21/4532* (2013.01); *H04N 21/4667* (2013.01); *H04N 21/47217* (2013.01); *H04N 21/6582* (2013.01); *H04N 21/812* (2013.01); *H04N 21/8456* (2013.01); *H04N 21/44204* (2013.01); *H04N 21/44213* (2013.01); *H04N 21/466* (2013.01)

(58) Field of Classification Search
CPC ......... H04N 21/4667; H04N 21/47217; H04N 21/6582; H04N 21/812; H04N 21/8456; H04N 21/44204; H04N 21/44213; H04N 21/466; G06Q 30/0242; H04H 60/33
USPC ...................................................... 725/14–15
See application file for complete search history.

(56) References Cited

U.S. PATENT DOCUMENTS

| | | | | | |
|---|---|---|---|---|---|
| 8,606,815 | B2 * | 12/2013 | Chen | ........................ | G06F 16/35 |
| | | | | | 707/777 |
| 8,671,423 | B1 | 3/2014 | Chang et al. | | |
| 8,839,281 | B2 * | 9/2014 | Valdez | .................... | H04H 60/33 |
| | | | | | 725/19 |
| 9,136,964 | B2 * | 9/2015 | Wang | ...................... | H04H 20/82 |
| 9,445,163 | B2 | 9/2016 | Card | | |
| 10,034,051 | B2 | 7/2018 | Card | | |
| 10,157,401 | B1 * | 12/2018 | Olds | .................. | G06Q 30/0246 |
| 11,537,971 | B2 * | 12/2022 | Orlowski | ......... | H04N 21/44204 |
| 2002/0059313 | A1 | 5/2002 | Yoon et al. | | |
| 2003/0233656 | A1 * | 12/2003 | Sie | ...................... | H04N 21/6587 |
| | | | | | 348/E7.071 |
| 2004/0133909 | A1 * | 7/2004 | Ma | ...................... | H04N 21/2668 |
| | | | | | 348/E7.071 |
| 2005/0097593 | A1 | 5/2005 | Raley et al. | | |
| 2006/0257099 | A1 | 11/2006 | Potrebic et al. | | |
| 2007/0022447 | A1 * | 1/2007 | Arseneau | ............... | H04H 60/15 |
| | | | | | 725/38 |
| 2007/0143370 | A1 * | 6/2007 | Bushmitch | ............. | H04H 60/46 |
| 2007/0154168 | A1 | 7/2007 | Cordray et al. | | |
| 2009/0183210 | A1 * | 7/2009 | Andrade | .......... | H04N 21/44204 |
| | | | | | 725/87 |
| 2010/0077435 | A1 * | 3/2010 | Kandekar | ............ | H04N 9/8233 |
| | | | | | 725/61 |
| 2010/0218208 | A1 | 8/2010 | Holden | | |
| 2010/0280846 | A1 | 11/2010 | Clements et al. | | |
| 2010/0280876 | A1 * | 11/2010 | Bowra | ............... | G06Q 30/0251 |
| | | | | | 705/14.69 |
| 2010/0293566 | A1 * | 11/2010 | Valdez | ............... | H04N 21/8352 |
| | | | | | 725/14 |
| 2010/0325660 | A1 * | 12/2010 | Holden | .............. | H04N 21/2387 |
| | | | | | 725/34 |
| 2011/0178880 | A1 | 7/2011 | Karaoguz et al. | | |
| 2011/0321077 | A1 | 12/2011 | Wang et al. | | |
| 2013/0035996 | A1 * | 2/2013 | Frey | ........................ | G06Q 30/02 |
| | | | | | 705/14.4 |
| 2016/0140618 | A1 * | 5/2016 | Duggal | .............. | G06Q 30/0269 |
| | | | | | 705/14.66 |

OTHER PUBLICATIONS

Extended European Search , issued Feb. 3, 2016, for European Application No. 13822572.7-1908 / 2877972, 8 pages.
International Search Report and Written Opinion , dated Nov. 21, 2013, for International Application No. PCT/US2013/052364. 11 pages.

\* cited by examiner

400

| Advertisement (Ad) Segment | Recorded User Interaction Associated with Ad Segment | Determined Level of Interest in Ad Segment |
|---|---|---|
| 304a | skipped Ad, then paused after Ad, then rewound, then played Ad | High |
| 304b | started skipping Ad, then paused during Ad, then continued skipping | Medium/Low |
| 304c | skipped entire Ad | Low |
| 304d | Played Ad without skipping any of it | Medium |
| 304e | Played Ad twice | Very High |

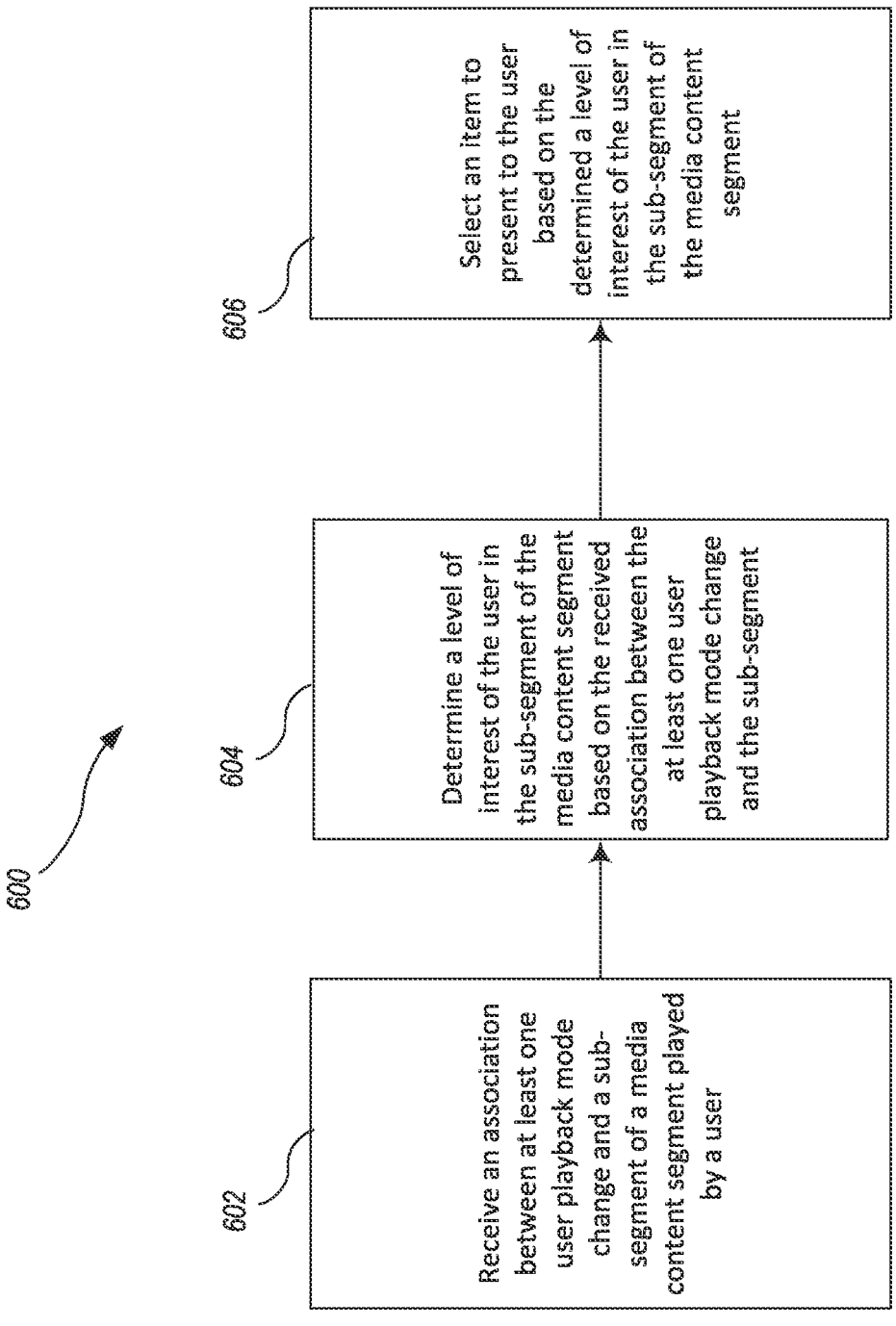

602
Receive an association between at least one user playback mode change and a sub-segment of a media content segment played by a user 604
Determine a level of interest of the user in the sub-segment of the media content segment based on the received association between the at least one user playback mode change and the sub-segment 606
Select an item to present to the user based on the determined a level of interest of the user in the sub-segment of the media content segment

700

702

Receive an indication regarding at least one user playback mode change occurring during playing of a media content segment

704

Associate the at least one user playback mode change with a sub-segment of the media content segment

706

Store the association between the at least one user playback mode change and the sub-segment of the media content segment

SYSTEMS AND METHODS FOR ASSESSING VIEWER INTEREST IN CONTENT AND ADVERTISEMENTS

TECHNICAL FIELD

The technical field relates to delivering media content and advertisements, and particularly to assessing viewer interest in media content and advertisements.

BRIEF SUMMARY

In one embodiment, particular user interactions with a receiving device occurring during playback of media content, such as rewinding to view an advertisement or pausing during an advertisement, signify viewer interest in the advertisement. The advertisement is then correlated with levels of interest of the user in the advertisement. There are three general things described by this example embodiment. The advertisement and the record of interaction are two initial things. The other is the correlation of the particular advertisement and the viewer interaction with it. Such correlation of playback modes or playback mode changes with levels of interest may then be used to select and provide targeted or customized content or other items to the user that are related to the advertisement that the user may likely be interested in, and thus increase the probability that the user would respond to such selected content.

For example, a method for assessing such viewer interest may include receiving an indication regarding a content playback mode change (e.g., a change from a skip or fast-forward mode to a pause or rewind mode) occurring during playing of a media content segment such as a television program. The method then proceeds to associate the playback mode change with a sub-segment of the television program, such as an advertisement, and a level of interest of a user in the advertisement is determined based on the associated content playback mode change. An item, such as an advertisement or promotional offer, may then be selected to be presented to the user based on the determined level of interest of the user in the advertisement. This selection may happen in the device or in a backend system.

BRIEF DESCRIPTION OF THE DRAWINGS

The components in the drawings are not necessarily to scale relative to each other. Like reference numerals designate corresponding parts throughout the several views.

FIG. 4 is a table illustrating correlations between the sub-segments of the media content stream of FIG. 3, user interactions associated with the sub-segments and different determined levels of interest in the sub-segments, according to one example embodiment.

FIG. 6 is a flow diagram of a method of selecting items based on assessing viewer interest in content and advertisements, according to one example embodiment.

DETAILED DESCRIPTION

Figure 1:
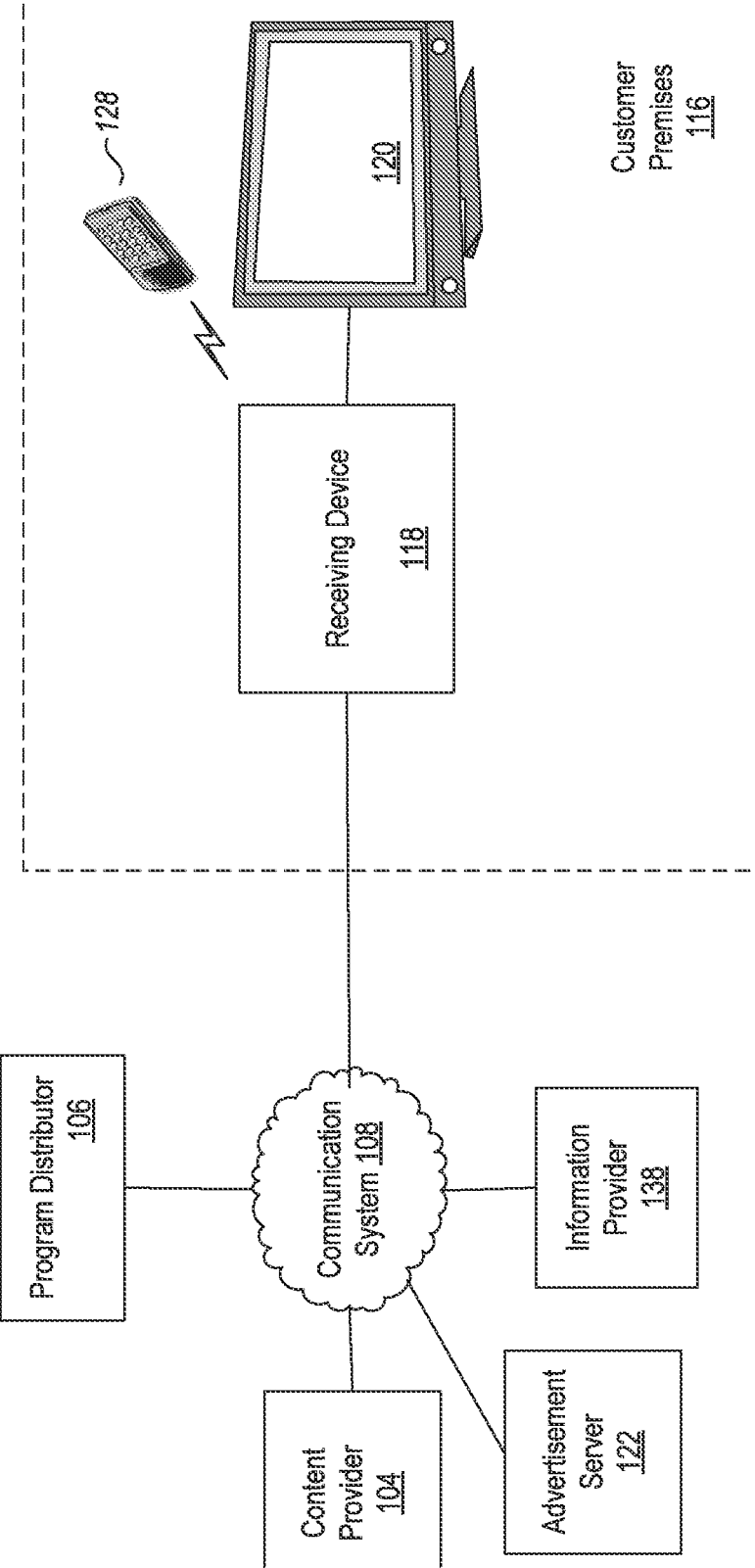
FIG. 1 is a block diagram illustrating an example content distribution environment in which embodiments of assessing viewer interest in content and advertisements may be implemented, according to one example embodiment.

FIG. 1 is an overview block diagram illustrating a content distribution environment in which embodiments of assessing viewer interest in content and advertisements may be implemented, according to one example embodiment.

Before providing additional details regarding the operation and constitution of methods and systems for assessing viewer interest in content and advertisements played on receiving devices, the example content distribution environment 102, within which such a receiving device may operate, will briefly be described.

In the content distribution environment 102, audio, video, and/or data service providers, such as television service providers, provide their customers a multitude of video and/or data programming (hereafter, collectively and/or exclusively "programming"). Such programming is often provided by use of a receiving device 118 communicatively coupled to a presentation device 120 configured to receive the programming. The programming may include any type of media content, including, but not limited to: television shows, news, movies, sporting events, advertisements, etc.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For convenience, examples of a receiving device 118 may include, but are not limited to, devices such as: a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or playback programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like.

Examples of a presentation device 120 may include, but are not limited to: a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality.

A content provider 104 provides program content, such as television content, to a distributor, such as the program distributor 106. Example content providers include television stations which provide local or national television programming and special content providers which provide premium based programming or pay-per-view programming.

Program content (i.e., a program including or not including advertisements), is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is ultimately communicated to the receiving device 118. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, Information provider 138 may also provide information to the receiving device 118 regarding insertion of advertisement or other additional content or metadata into a media content segment (e.g., a program) provided to the receiving device 118. In some embodiments, such advertisements or other additional content or metadata may be provided by an advertisement server 122 to the content provider 104 or directly to the receiving device 118.

In the illustrated example, the content provider 104, information provider 138 and/or advertisement server 122 may receive information from the receiving device 118. For example, the content provider 104, information provider 138 and/or advertisement server 122 may receive indications from the receiving device 118 regarding a playback mode the receiving device is in, or has been in and/or a playback mode change associated with a media content segment or a sub-segment of a media content segment (e.g., an advertisement), or any other information indicating, directly or indirectly, a user level of interest in a media content segment or in a sub-segment of the media content segment. In one embodiment, the content provider 104, information provider 138 and/or advertisement server 122 may receive information from the receiving device 118 regarding an attempt by a user of the receiving device to view the sub-segment of the media content segment in normal speed playback mode instead of skipping the sub-segment of the media content segment.

The content provider 104 or information provider 138 may also control the receiving device 118 by sending commands or metadata associated with media content to alert the receiving device 118 to monitor playback modes associated with one or more particular advertisements or other media content sub-segments of the media content. In some embodiments, the content provider 104 or information provider 138 could also send commands to the receiving device 118 through a wired medium (e.g., Ethernet) to the receiving device 118.

In one embodiment, the advertisement server 122 is configured to select particular content for insertion into a media content segment (e.g., a program) provided to the receiving device 118 based on the received indications from the receiving device 118. As previously mentioned, the received indications from the receiving device 118 may indicate a playback mode the receiving device is in, or has been in and/or a playback mode change associated with a media content segment or a sub-segment of a media content segment (e.g., an advertisement), or any other information indicating, directly or indirectly, a user level of interest in a media content segment or in a sub-segment of the media content segment.

The above description of the content distribution environment 102, the customer premises 116, and the various devices therein, is intended as a broad, non-limiting overview of an example environment in which various embodiments of assessing viewer interest in content and advertisements may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein.

Example embodiments described herein provide applications, tools, data structures and other support to implement assessing viewer interest in content and advertisements. Other embodiments of the described techniques may be used for other purposes, including assessing viewer interest in content and advertisements played on other receiving devices, such as audio and DVD players, digital recorders, computers, peripherals, televisions, mobile devices, telephones, and other electronic devices, etc. In the following description, numerous specific details are set forth, such as data formats, program sequences, processes, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
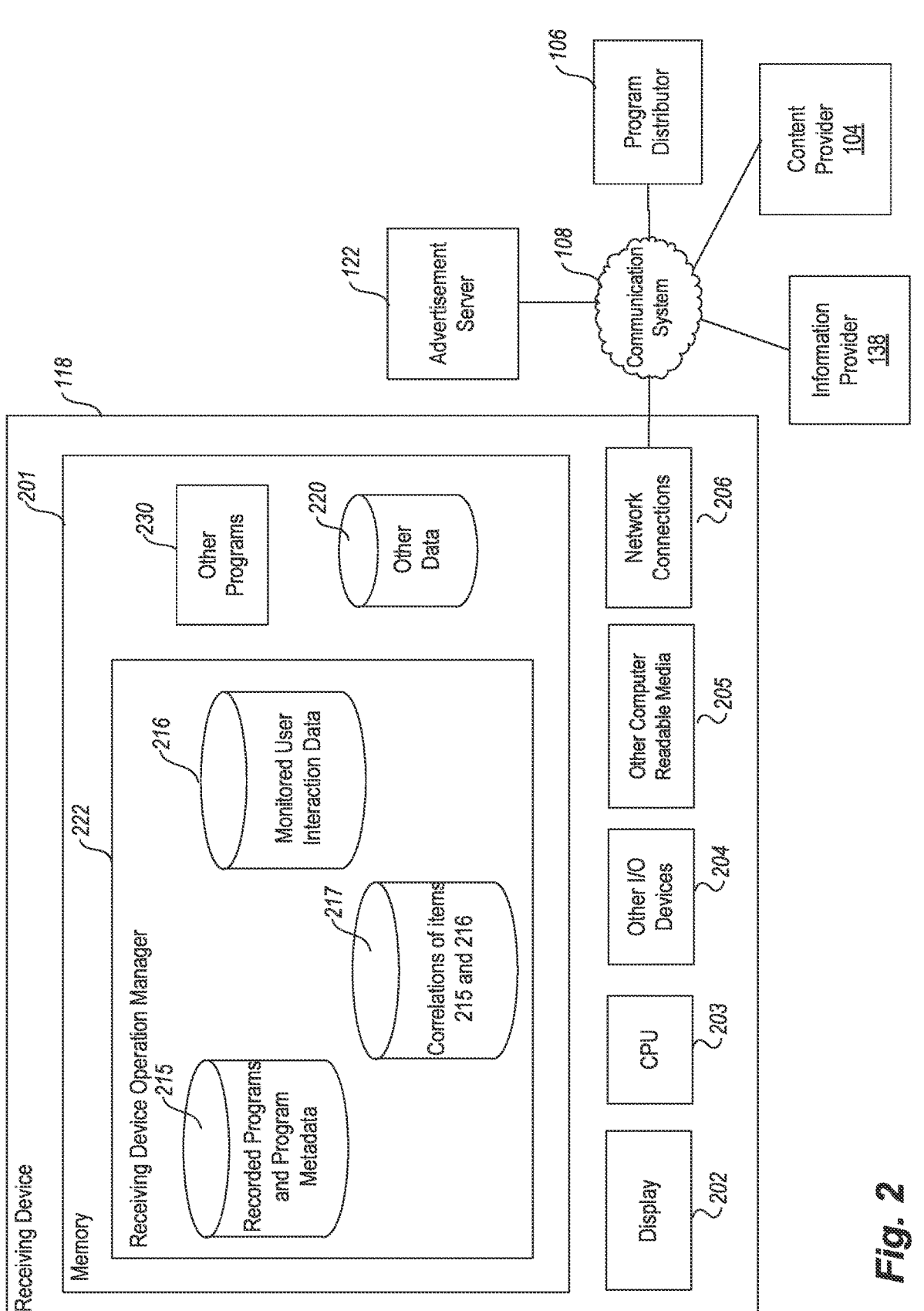
FIG. 2 is a block diagram illustrating elements of an example receiving device used in assessing viewer interest in content and advertisements, according to one example embodiment.

FIG. 2 is a block diagram illustrating elements of an example receiving device 118 used in assessing viewer interest in content and advertisements, according to one example embodiment.

In one embodiment, the receiving device 118 is a set-top box configured to receive, record and display programming on a presentation device. In other embodiments, the receiving device 118 is a presentation device, such as a television, or is a digital video recorder (DVR) device.

Note that one or more general purpose or special purpose computing systems/devices may be used to operate the receiving device 118; store information regarding the receiving device 118, program metadata, and user interaction data (including content playback modes); and communicate with the content provider 104, information provider 138 and/or advertisement server 122. In addition, the receiving device 118 may comprise one or more distinct computing systems/devices and may span distributed locations. Furthermore, each block shown may represent one or more such blocks as appropriate to a specific embodiment or may be combined with other blocks. Also, the receiving device operation manager 222 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. The receiving device operation manager 222 is shown residing in memory 201. In other embodiments, some portion of the contents and some, or all, of the components of the receiving device operation manager 222 may be stored on and/or transmitted over the other computer-readable media 205. The components of the receiving device 118 and operation manager 222 preferably execute on one or more CPUs 203 and facilitate the receiving, decoding, processing, selecting, recording, playback and displaying of programming, as described herein. The receiving device operation manager 222 also facilitates recording and storage of user interaction data associated with playback of the recorded programs (e.g., play, fast-forward, rewind, pause, slow-motion playback, etc.) and communication with peripheral devices, via the I/O devices 204 and with remote systems (e.g., the content provider 104, the advertisement server 122, the program distributor 106, and/or the information provider 138) via the network connections 206.

Recorded programming may reside on the recorded programs and program metadata repository 215. The recorded programming stored in the recorded programs and program metadata repository 215 may also include a recorded media content segment in a memory buffer to enable the user to perform a pause or rewind function on the media content segment while viewing a broadcast of the media content segment in real time or while receiving the media content segment as streaming video. The recorded programs and program metadata repository 215 may also store various program metadata associated with the recorded programming stored in the recorded programs and program metadata repository 215, such as that including, but not limited to, locations within the recorded programming of content subsegments (e.g., advertisements) and information regarding such content sub-segments (e.g., identification and categorization of particular advertisements, etc.).

The monitored user interaction data repository 216 may include data regarding previous or current user interactions with the receiving device 118, including, but not limited to content playback modes (e.g., play, fast-forward, rewind, pause, slow-motion playback, etc.), changes in content playback modes, times associated with content playback modes or changes in content playback modes, offset values relative to a beginning of a media content segment at which a content playback mode change occurred, identification of content segments or sub-segments associated with content playback modes or changes in content playback modes, etc. The monitored user interaction data repository 216 may also store data regarding, but is not limited to: a current mode the receiving device 118 is in, whether the receiving device is in a stand-by mode, whether a screen saver is activated by the receiving device 118, whether a program is currently being generated for display by the receiving device 118, a current channel the receiving device 118 is tuned to, a current time, a current status of the receiving device; timestamps of previous periodic status checks of the receiving device 118, current configuration information of the receiving device, timestamps of user commands received by the receiving device 118, whether the receiving device is currently receiving content or programming, timestamps regarding any event the receiving device had performed, lengths of times the receiving devices had been tuned to particular channels or played particular content, etc.

The correlated event data repository 217 may be calculated immediately when the corresponding user interaction happens, and may then be stored or transmitted. Alternately, the event data repository may be calculated later at a scheduled time or when device resources are available and subsequently transmitted. This data stored in this data repository 217 may be calculated off the receiving device 118 in a backend system when user interaction data is received. In some embodiments and/or the calculation of the correlation and the creation of the data stored in data repository 217 may be performed locally on the receiving device.

The user interaction data may be collected by the receiving device operation manager or other programs 230 and communicated via the network connections 206 through the communication system 108 to the content provider 104, information provider 138 and/or advertisement server 122 to facilitate determining viewer interest in content and advertisements played on the receiving device 118. Also, the receiving device operation manager 222 may interact via the communication system 108 with other devices. For example, the other device may be a home computing system (e.g., a desktop computer, a laptop computer, etc.) that includes or has access to (e.g., via communication system 108) the functionality of the content provider 104, information provider 138 and/or advertisement server 122. The corresponding event metadata 216 may have come from the device or may have come from an external source.

Other code or programs 230 (e.g., an audio/video processing module, a program guide manager module, a Web server, and the like), and potentially other data repositories, such as data repository 220 for storing other data (user profiles, preferences and configuration data, etc.), also reside in the memory 201, and preferably execute on one or more CPUs 203. Of note, one or more of the components in FIG. 2 may or may not be present in any specific implementation. For example, some embodiments may not provide other computer readable media 205 or a display 202.

In some embodiments, the receiving device 118 and operation manager 222 includes an application program interface ("API") that provides programmatic access to one or more functions of the receiving device 118 and operation manager 222. For example, such an API may provide a programmatic interface to one or more functions of the receiving device operation manager 222 that may be invoked by one of the other programs 230, the content provider 104, information provider 138, advertisement server 122, or some other module. In this manner, the API may facilitate the development of third-party software, such as user interfaces, plug-ins, adapters (e.g., for integrating functions of the receiving device operation manager 222 and information provider 138 into desktop applications), and the like to facilitate assessing and determining viewer interest in content and advertisements played using the receiving device 118.

In an example embodiment, components/modules of the receiving device 118 and operation manager 222 are implemented using standard programming techniques. For example, the receiving device operation manager 222 may be implemented as a "native" executable running on the CPU 203, along with one or more static or dynamic libraries. In other embodiments, the receiving device 118 and operation manager 222 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the receiving device operation manager 222. In one embodiment, instructions cause the CPU 203 or some other processor, such as an I/O controller/processor, to select and present various programming; pause, rewind, fast-forward programming; or cause the receiving device to record or otherwise store user interactions, times of user interactions, and/or associations of user interactions with particular content segments or sub-segments.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported by a receiving device operation manager 222 implementation. Also, other functions could be implemented and/or performed by each component/module, and in different orders, and by different components/modules, yet still achieve the functions of the receiving device 118 and operation manager 222.

In addition, programming interfaces to the data stored as part of the receiving device 118 and operation manager 222, can be available by standard mechanisms such as through C, C++, C#, and Java APIs; libraries for accessing files, databases, or other data repositories; scripting languages such as XML; or Web servers, FTP servers, or other types of servers providing access to stored data. The recorded programs, program metadata repository 215 and the monitored user interaction data repository 216 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the receiving device operation manager 222.

Furthermore, in some embodiments, some or all of the components of the receiving device 118 and operation manager 222 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
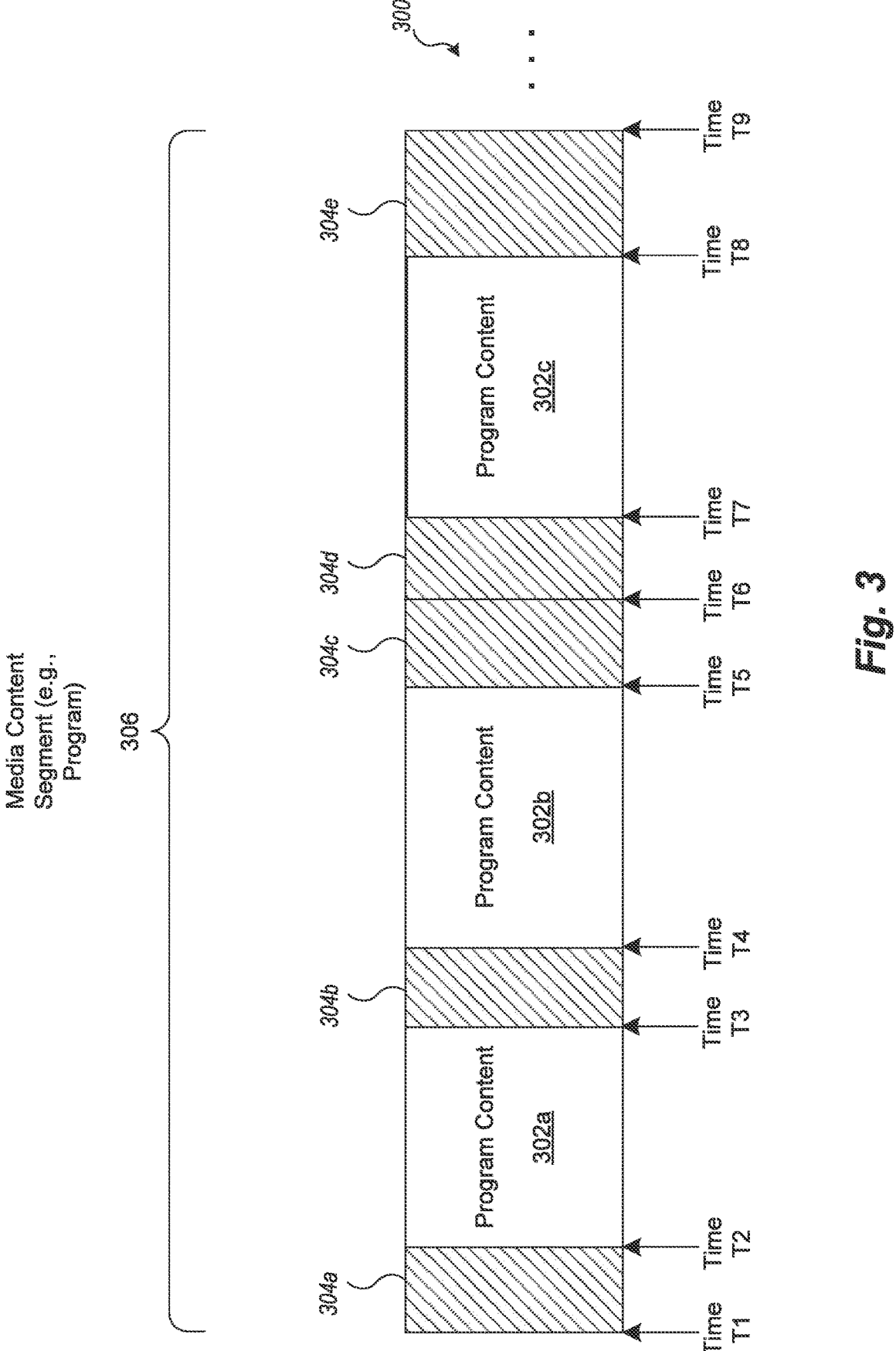
FIG. 3 is a diagram of a representation of a media content stream received by the receiving device of FIG. 2, according to one example embodiment.

FIG. 3 is a diagram of a representation of a media content stream 300 received by the receiving device 118 of FIG. 2, according to one example embodiment.

Users playing back recorded or buffered media content on the receiving device 118 may often skip or fast-forward through particular segments of the media content. For example, users may often fast-forward or skip through advertisements or commercials previously inserted into a program currently being played back by a user. Thus, it may be difficult to determine whether a user has actually viewed, received an impression from, or otherwise been exposed to the various content segments (e.g., advertisements) in the media content being played. However, if a user does play the full the advertisement or a portion thereof, pauses during the advertisement, or rewinds to the advertisement to play the advertisement, this indicates that there is a higher probability the user may have viewed the advertisement. This may even indicate a particular level of interest of the user in the advertisement or of something viewed within the advertisement. In many instances, one or more frames of the advertisement may be presented at some point within or throughout the fast-forwarding or skipping of the advertisement. This may enable the viewer to notice something presented within the advertisement that may be of interest and then cause the user to pause during the advertisement or rewind to play all or a portion of the advertisement in normal playback speed. Thus, it is beneficial to advertisers, content providers, publishers, retailers, service providers, television ratings services, or data mining systems, etc., to correlate these and other particular user interactions with the particular advertisement or content segment the user intended to view. Such correlation data may then be used to select and provide targeted or customized content or other items to the user that are related to the advertisement that the user may more likely be interested in, and thus increase the likelihood that a user would respond to such selected content, or in some instances, prevent particular advertisements or content from being provided to a user.

For example, shown in FIG. 3 is a media content segment (e.g., a program) 306 of a media content stream 300 that is being played back by a user of the receiving device 118. The program content segment 306, including program content segments 302a, 302b, 302c, is interspersed with various program content sub-segments (e.g., advertisements 304a, 304b, 304c, 304d, 304e). The program content segment 306 may be, for example, any type media content, including, but not limited to, television shows, news, movies, sporting events, etc. At or near time T3, a user may activate a fast-forward or skip function on the receiving device 118 to fast-forward through or skip over advertisement 304b. An indication of this user interaction may be recorded or otherwise stored by the receiving device 118 and associated with the advertisement 304b. This association with the advertisement 304b may be performed by recording a first offset relative to a beginning of the media content segment 306 at which the fast-forward through or skip command had occurred and then determining or recalling from memory a second offset relative to a beginning of the media content segment 306 at which the advertisement 304b starts or ends. The receiving device 118 then correlates the first offset and the second offset. This correlation may include determining that the two offsets are the same or close enough to each other within a determined threshold value (e.g., within a determined number of seconds or determined number of frames) to determine that the user interaction should be associated with the advertisement 304b. Thus, the first offset and the second offset may be offsets based on a time count or based on a video frame count, or any other measurable item indicative of a location within the media content segment 306.

At T4 (or within a determined time or location within the media content segment 306 thereafter) the user may initiate a rewind command to a point within or near (as defined by a determined threshold amount as described above) the advertisement 304b. This rewind interaction may also be recorded according to the process described above. Thus, the fast-forward, skip and/or the rewind command (or the sequence of such commands) may be associated with the advertisement 304b in the manner described above. The user may then initiate a play command that results in playing all or a portion of advertisement 304b at normal playback speed. This play interaction may also be recorded and associated with the advertisement 304b based on the advertisement offset data or other metadata indicating locations within the media content segment 306 of the advertisement 304b. Thus, the tracked and recorded fast-forward or skip interaction, the rewind interaction, and the subsequent play interaction may each be associated with the advertisement 304b and the specific combination and/or sequence of one or more of these interactions associated with the advertisement 304b may be recorded as data to be used in determining an interest level of the user in the advertisement 304b.

A pause interaction may also be associated with the advertisement 304b by itself, or in combination with one or more of the skip interaction, the rewind interaction, and the play interaction. For example, if a user watching a live television broadcast pauses at the beginning of an advertisement, and then skips past the advertisement to avoid viewing the advertisement, this sequence of interactions may be associated with the advertisement with an indication that the user has a low level of interest in the advertisement. On the other hand, if a user pauses during the middle of an advertisement while skipping through the advertisement, this sequence of interactions may be associated with the advertisement with an indication that the user has a higher level of interest in the advertisement or a sub-section of the advertisement at which the pause occurred. Thus, pauses associated with an advertisement, depending on the relationship of the pause with other interactions associated with the advertisement may be associated with varying levels of interest of the user in the respective advertisement.

Also, in some embodiments, the tracked and recorded fast-forward or skip interaction, the rewind interaction, and the subsequent play interaction are each be associated with a particular sub-segment of the advertisement 304b in the same manner that these interactions are associated with the advertisement 304b itself by using data identifying particular locations of interest within the advertisement 304b. Thus, the specific combination and/or sequence of one or more of these interactions associated with the advertisement 304b may also, or instead, be recorded as data to be used in determining an interest level of the user in a particular part of the advertisement 304b or a particular item shown in the particular part of the advertisement 304b. For example, if the advertisement 304b included a sequence of frames displaying a specific automobile and the user rewound to a point within the advertisement 304b at or near the location within the advertisement 304b displaying the automobile, a determination may be made that the user has a level of interest in the specific automobile or type of automobile displayed at that location in the advertisement 304b.

The other advertisements 304a, 304b, 304c, 304d, 304e may also be associated with various user interactions as described above. Also, although shown as advertisements 304a, 304b, 304c, 304d, 304e, in some embodiments, one or more of the advertisements 304a, 304b, 304c, 304d, 304e may instead be any sub-segment of interest of the media content segment 306. For example, advertisement 304c may be a particular sub-segment of a program that includes a product placement, or any other sub-segment for which user interactions such as pausing, fast-forward, rewinding, etc., may be useful to track, such as to determine the popularity of particular portions of a television show, movie or other program.

FIG. 4 is a table 400 illustrating example correlations between the sub-segments of the media content stream 300 of FIG. 3, user interactions associated with the advertisements 304a, 304b, 304c, 304d, 304e, and different determined levels of interest in the advertisements 304a, 304b, 304c, 304d, 304e. Shown are column 402a indicating particular advertisements, column 402b indicating example user interactions associated with the advertisements and column 402c indicating example determined levels of interest in the advertisements.

Various different combinations and sequences of user interactions associated with a particular advertisement may be used to assign a level of interest in the particular advertisement of the user who had performed the user interactions. Some examples of such determined levels of user interest are shown in FIG. 4 in column 402c. However, other sequences and combinations of user interactions may be used to determine different levels of interest in associated content or advertisements (ads), and other scales, models or levels based on statistical analyses may be used.

As shown in FIG. 4, in one example instance, advertisement 304a is associated with user interactions that indicated the user had skipped ad 304a, then paused after ad 304a, then rewound to ad 304a, and then played all or part of ad 304a. Thus, the determined level of interest of that user in ad 304a was recorded as "High". In another example instance, ad 304c is associated with user interactions that indicated the user had skipped the entire ad 304c. Thus, the determined level of interest of that user in ad 304c was recorded as "Low". User interactions and statistics recorded over time regarding user behavior or interactions relative to advertisements in general or specific types of advertisements may also be used as a factor in determining, or used in weighting a determination of, a level of interest in a particular advertisement. For example, if the recorded user interactions indicate the user always or nearly always skips ads, then when an interaction of the user indicates the user decided to play a particular ad, greater importance will be given to that interaction of the user playing that ad than to another user who played the ad, but was determined to always or nearly always play ads without skipping them. Thus, individual models for determining levels of interest may be generated and used for different users based on previous interactions of particular users with advertisements, or particular types of advertisements or content. Also, if it is determined that a user regularly watches particular types of ads and skips others, this information may also be recorded and used to determine preferences of the user or otherwise used to select content to provide to the user based on the particular types of ads viewed or skipped.

Some or all of the correlations and other similar correlations shown in table 400 may be determined by the receiving device 118 and stored in one or more of: the monitored user interaction data repository 216, the recorded programs and program metadata repository 215, the correlated event data repository 217, and the "other" data repository 220 of the receiving device 118. Also, some or all of the correlations and other similar correlations shown in table 400 may be determined by, received by, and/or stored by the content provider 104, information provider 138 and/or advertisement server 122.

Figure 5:
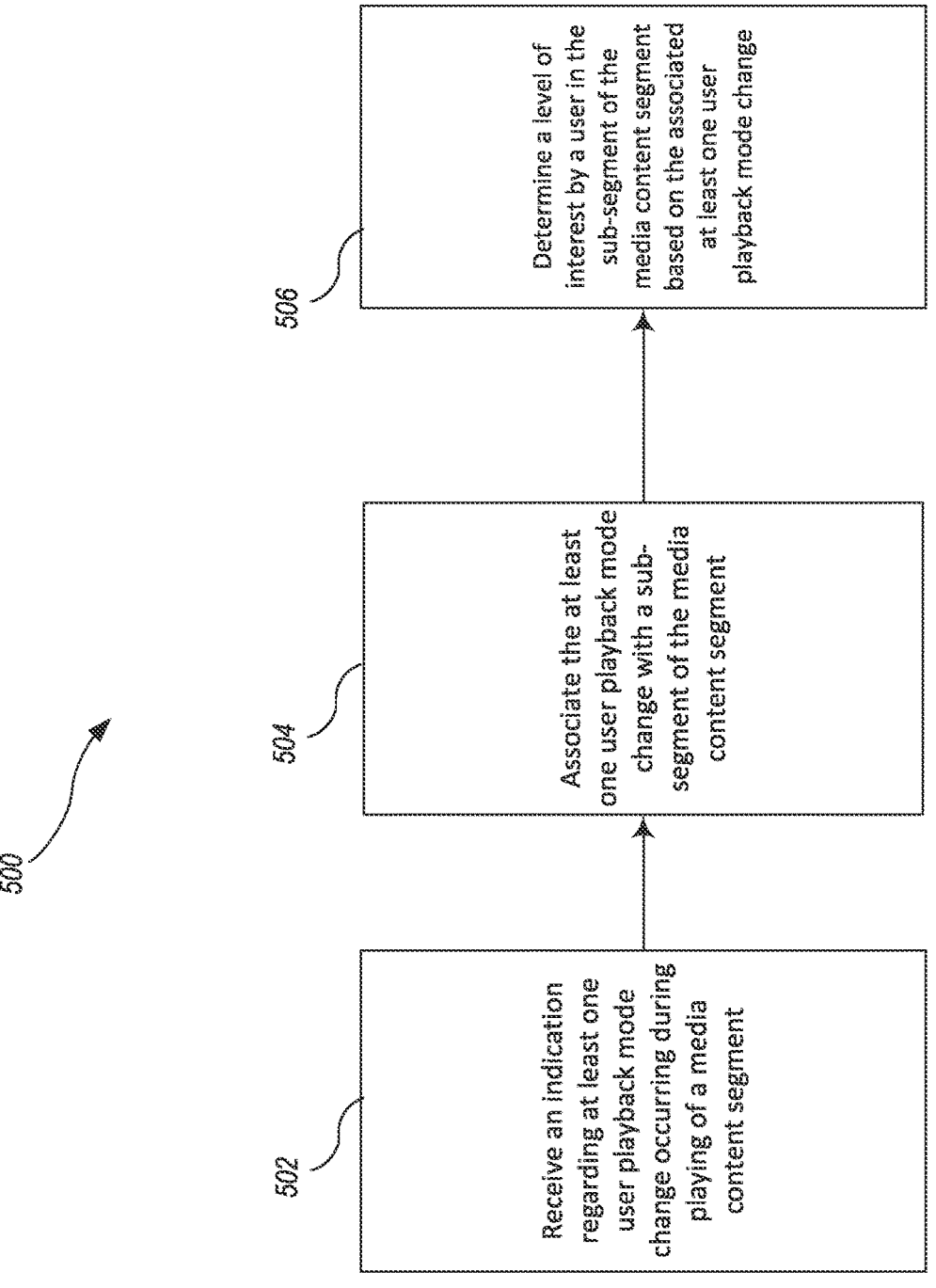
FIG. 5 is a flow diagram of a method of assessing viewer interest in content and advertisements, according to one example embodiment.

FIG. 5 is a flow diagram of a method 500 of assessing viewer interest in content and advertisements, according to one example embodiment.

At 502, the receiving device 118 or a system remote from the receiving device 118 receives an indication regarding at least one user playback mode change occurring during playing of a media content segment.

At 504, the receiving device 118 or a system remote from the receiving device 118 associates the at least one user playback mode change with a sub-segment of the media content segment.

At 506, the receiving device 118 or a system remote from the receiving device 118 determines a level of interest of a user in the sub-segment of the media content segment based on the associated at least one user playback mode change.

FIG. 6 is a flow diagram of a method 600 of selecting items based on assessing viewer interest in content and advertisements, according to one example embodiment.

At 602, the receiving device 118 or a system remote from the receiving device 118 receives an association between at least one user playback mode change and a sub-segment of a media content segment played by a user.

At 604, the receiving device 118 or a system remote from the receiving device 118 determines a level of interest of the user in the sub-segment of the media content segment based on the received association between the at least one user playback mode change and the sub-segment.

At 606, the receiving device 118 or a system remote from the receiving device 118 selects an item to present to the user based on the determined level of interest of the user in the sub-segment of the media content segment. In some embodiments, if the receiving device 118 selects such an item to present to the user based on the determined level of interest, the receiving device 118 may have received a plurality of items from which to select from the content provider 104, information provider 138 and/or advertisement server 122 and previously stored or cached items on the receiving device 118 memory 201 in order to quickly insert such items at selected positions within the media content stream 300 for display to the user. In other embodiments, content provider 104, information provider 138 and/or advertisement server 122 may provide such items in the media content stream 300 provided to the receiving device 118 from the content provider 104, information provider 138 and/or advertisement server 122.

Figure 7:
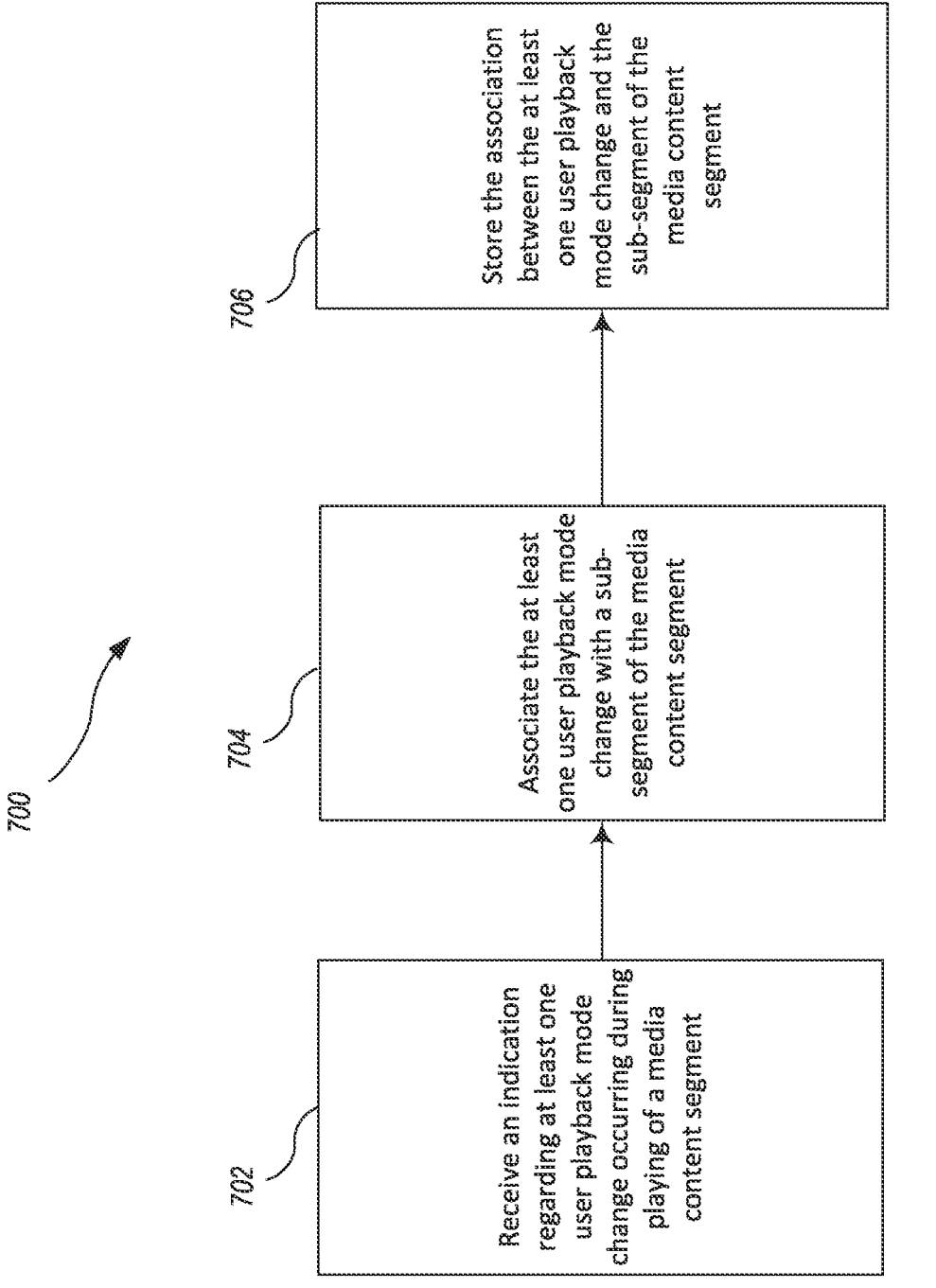
FIG. 7 is a flow diagram of a method of associating a content playback mode change with a sub-segment of a media content segment, according to one example embodiment.

FIG. 7 is a flow diagram of a method 700 of associating a user playback mode change with a sub-segment of a media content segment, according to one example embodiment.

At 702, the receiving device 118 or a system remote from the receiving device 118 receives an indication regarding at least one user playback mode change occurring during playing of a media content segment.

At 704, the receiving device 118 or a system remote from the receiving device 118 associates the at least one user playback mode change with a sub-segment of the media content segment.

At 706, the receiving device 118 or a system remote from the receiving device 118 stores the association between the at least one user playback mode change and the sub-segment of the media content segment.

While various embodiments have been described hereinabove, it is to be appreciated that various changes in form and detail may be made without departing from the spirit and scope of the invention(s) presently or hereafter claimed.

The invention claimed is:

1. A computer-implemented method comprising:

receiving, by a receiving device, an alert over the Internet on a computer network communication channel from a remote server, wherein the alert activates a program for assessing viewer interest on the receiving device to monitor playback modes associated with a media content segment;

receiving, by an indication regarding a content playback mode change occurring during playing of a media content segment;

associating in a database, the content playback mode change with a sub-segment of the media content segment;

repeating the receiving an indication and the associating the content playback mode change, for a plurality of different content playback mode changes performed during or in connection with the sub-segment of the media content segment;

determining a level of interest of a user in the sub-segment of the media content segment based on the plurality of different content playback mode changes; and determining a category of interest based on the determined level of interest;

wherein:

the media content segment comprises a program for television; and the sub-segment of the media content segment comprises an advertisement within the same program for television.

2. The method of claim 1 wherein the determining a level of interest of the user includes:

determining a lower level of interest of the user in the sub-segment of the media content segment if a specific content playback mode change indicates the user skipped at least a portion of the sub-segment than if the user played the entire sub-segment in normal speed.

3. The method of claim 1 wherein the determining a level of interest of the user includes:

determining a higher level of interest of the user in the sub-segment of the media content segment if a specific playback mode change indicates the user started to skip the sub-segment and then rewound to attempt to view the sub-segment than if the specific content playback mode change indicates the user skipped the sub-segment entirely.

4. The method of claim 1 further comprising:

transmitting the determined level of interest over the Internet on a computer network communication channel to a device associated with a service provider; and causing, in response to the transmitting the determined level of interest, a connection for receiving selected media content to be enabled via the Internet on the computer network communication channel to the device associated with the service provider and a media viewer application to display, on a display device that is remote from the device associated with the service provider, selected media content based on the determined level of interest.

5. The method of claim 1 further comprising:

recording the media content segment before receiving the indication regarding the content playback mode change during playing of the media content segment.

6. The method of claim 5 wherein the recording includes recording the media content segment in a memory buffer to enable the user to perform a rewind function on the media content segment while viewing a broadcast of the media content segment in real time or while receiving the media content segment as streaming video.

7. The method of claim 1 wherein the entire media content segment is previously recorded prior to the playing of the media content segment.

8. The method of claim 1 wherein the associating the content playback mode change with a sub-segment of the media content segment includes:

recording a first offset relative to a beginning of the media content segment at which the content playback mode change occurred;

determining a second offset relative to a beginning of the media content segment at which the sub-segment starts or ends;

correlating the first offset and the second offset; and associating the content playback mode change with a sub-segment of the media content segment based on the correlation.

9. The method of claim 8 wherein the first offset and the second offset are offsets based on a time count or based on a video frame count.

10. A system comprising:

at least one processor; and a memory coupled to the at least one processor, wherein the at least one processor is configured to perform operations comprising:

receiving, by a receiving device, an alert over the Internet on a computer network communication channel from a remote server, wherein the alert activates a program for assessing viewer interest on the receiving device to monitor playback modes associated with a media content segment;

receiving an indication regarding a content playback mode change occurring during playing of a media content segment;

associating in a database, the content playback mode change with a sub-segment of the media content segment;

repeating the receiving an indication and the associating the content playback mode change for a plurality of different content playback mode changes performed during or in connection with the sub-segment of the media content segment;

determining a level of interest of a user in the sub-segment of the media content segment based on the plurality of different content playback mode changes; and determining a category of interest based on the determined level of interest;

wherein:

the media content segment comprises a program for television; and the sub-segment of the media content segment comprises an advertisement within the same program for television.

11. The system of claim 10 wherein the association between the content playback mode change and the sub-segment of the media content segment indicates a level of interest of the user who performed the content playback mode change in the sub-segment of the media content segment.

12. The system of claim 10 wherein the at least one processor is further configured to perform operations comprising:

communicating the association between the plurality of different content playback mode changes and the sub-segment of the media content segment; and receiving, in response to the communicated association, selected content for display by the receiving device based on the communicated association.

13. The system of claim 10 wherein the determining a level of interest of the user includes:

determining a lower level of interest of the user in the sub-segment of the media content segment if a specific content playback mode change indicates the user skipped at least a portion of the sub-segment than if the user played the entire sub-segment in normal speed.

14. The system of claim 10 wherein the determining a level of interest of the user includes:

determining a higher level of interest of the user in the sub-segment of the media content segment if a specific playback mode change indicates the user started to skip the sub-segment and then rewound to attempt to view the sub-segment than if the content playback mode change indicates the user skipped the sub-segment entirely.

15. The system of claim 10 wherein the operations further comprise:

transmitting the determined level of interest over the Internet on a computer network communication channel to a device associated with a service provider; and causing, in response to the transmitting the determined level of interest, a connection for receiving selected media content to be enabled via the Internet on the computer network communication channel to the device associated with the service provider and a media viewer application to display, on a display device that is remote from the device associated with the service provider, selected media content based on the determined level of interest.

16. The system of claim 10 wherein the operations further comprise:

recording the media content segment before receiving the indication regarding the content playback mode change during playing of the media content segment.

17. A non-transitory computer readable medium storing program instructions, which, when executed by at least one processor of a receiving device, cause the receiving device to perform operations comprising:

receiving, by a receiving device, an alert over the Internet on a computer network communication channel from a remote server, wherein the alert activates a program for assessing viewer interest on the receiving device to monitor playback modes associated with a media content segment;

receiving an indication regarding a content playback mode change occurring during playing of a media content segment;

associating in a database, the content playback mode change with a sub-segment of the media content segment;

repeating the receiving an indication and the associating the content playback mode change for a plurality of different content playback mode changes performed during or in connection with the sub-segment of the media content segment:

determining a level of interest of a user in the sub-segment of the media content segment based on the plurality of different content playback mode changes; and determining a category of interest based on the determined level of interest;

wherein:

the media content segment comprises a program for television; and the sub-segment of the media content segment comprises an advertisement within the same program for television.

* * * * *